G. W. KUHN.
ELECTRICAL TESTING SYSTEM.
APPLICATION FILED FEB. 19, 1920.
1,397,975.
Patented Nov. 22, 1921.
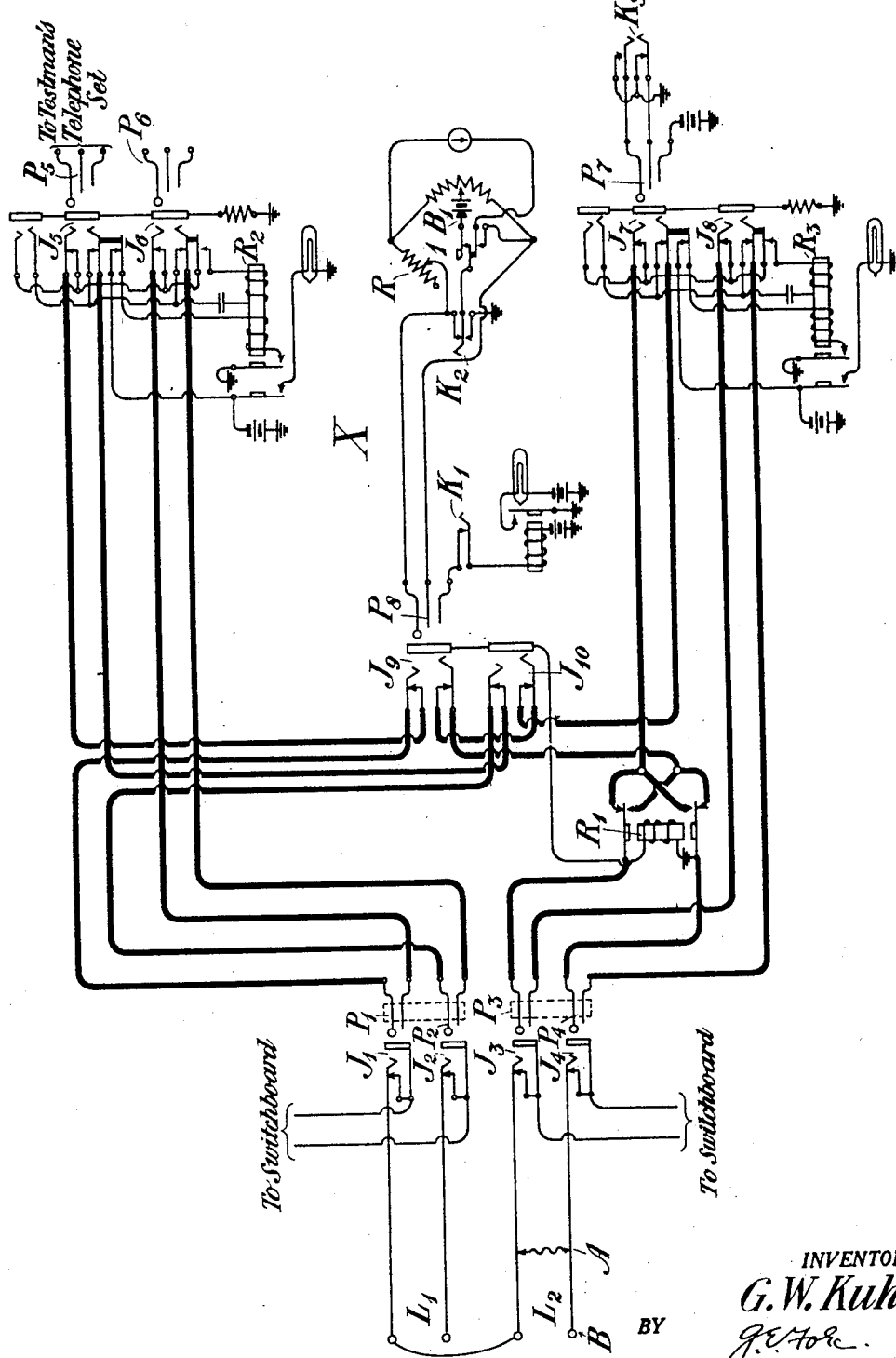
INVENTOR.
G. W. Kuhn
BY
ATTORNEY

UNITED STATES PATENT OFFICE.

GEORGE W. KUHN, OF BROOKLYN, NEW YORK, ASSIGNOR TO AMERICAN TELEPHONE AND TELEGRAPH COMPANY, A CORPORATION OF NEW YORK.

ELECTRICAL TESTING SYSTEM.

1,397,975.  Specification of Letters Patent.  Patented Nov. 22, 1921.

Application filed February 19, 1920. Serial No. 359,985.

*To all whom it may concern:*

Be it known that I, GEORGE W. KUHN, residing at Brooklyn, in the county of Kings and State of New York, have invented certain Improvements in Electrical Testing Systems, of which the following is a specification.

This invention relates to electrical testing systems, and more particularly to a selective switching arrangement for facilitating the connection of electrical testing apparatus with defective circuits.

In the testing arrangements heretofore used, in locating, for example, the position of a short circuit upon a pair of electrical conductors, the customary practice is to measure the loop resistance through the fault, and then to make the three-wire test upon the circuit, which involves the use of a faultless conductor in addition to the two faulty wires. As a faultless conductor it is customary to use one wire of a good, non-defective pair, preferably of the same gage of wire as the defective pair, and extending through the same cable or on the same pole line as the defective pair. It is also desirable that, at the exchange where the testing apparatus is located, each individual conductor shall be available so that the testing circuit may be readily connected with the defective pair and with the proper wire of the good pair, that is, the wire that is connected with the defective pair to enable the making of the three-wire test.

In large toll offices, of course, it is customary to extend the line circuits through a so-called test board in which each wire of a pair terminates upon its own jack so that the proper individual wires may be connected with the Wheatstone bridge network located in the same switchboard and adapted to be connected with the individual conductors by means of single conductor cords. In smaller offices, in which only a few toll lines terminate, it is not economical to install such a test board. The usual practice is to loop such lines through jacks located in a so-called jack-panel, each wire terminating in a separate jack. Associated with this jack-panel are cords having plugs which, when inserted in the said jacks, are adapted to open, at this point, the connection between the line and drop sides of the circuit. The circuit, however, remains closed through other jacks located in the test desk with which the said circuit is connected by means of the said cords. By means of the latter jacks, the testman's telephone set may be connected with the circuit, but this arrangement of jacks does not render available at the test desk the individual wires necessary, for example, in making the three wire test.

It is the object of this invention to provide means located at the said test desk, whereby the proper combination of conductors with which the said cords may be connected may be selected for connection with the Wheatstone bridge measuring circuit located at the said test desk.

This invention will be better understood from the following description when read in connection with the attached drawing showing one embodiment of the invention.

In the drawing $L_1$ and $L_2$ represent two electrical transmission lines, as for example, two toll telephone lines which loop through the jacks $J_1$, $J_2$, $J_3$ and $J_4$ of a so-called jack-panel located usually in the terminal room of the exchange in which the said lines terminate. Each of these lines, after looping through the said jacks, extends to a line jack located in the operating switchboard at this office. Located at the jack-panel are the plugs $P_1$, $P_2$, $P_3$ and $P_4$, which are adapted for connection with the jacks $J_1$, $J_2$, $J_3$ and $J_4$, and which together with their associated cords serve to connect the lines $L_1$ and $L_2$ and other similar lines with the jacks at the test desk X.

At the test desk X, the line side of the line $L_1$ is terminated on the jacks $J_5$, and the switchboard side upon jack $J_6$ which afford means for connecting the testman's telephone circuit or the testing circuit, with the line conductors or with the switchboard conductors of the line $L_1$. In a similar manner, the line $L_2$ is also terminated at the test desk X by means of the jacks $J_7$ and $J_8$. Associated with the jack $J_5$ is the plug $P_5$ which when inserted in the said jack serves to connect the testman's telephone set with the circuit with which the plugs $P_1$ and $P_2$ may be connected at the jack-panel. Associated with the jack $J_6$ is a dummy plug $P_6$ which, for reasons to be made clearer hereafter, is designed to open the contacts of the jack $J_6$. Associated with the jack $J_7$ is a plug $P_7$ connected with the key $K_8$ by means of which either a tip or ring contact of the said jack may be grounded. The telephone set associated with plug $P_5$ is also adapted for connection with the jacks $J_7$ and $J_8$. Associated with the jacks $J_5$ and $J_6$ is the relay $R_2$ and likewise associated with the jacks $J_7$ and $J_8$ is the relay $R_3$, which, together with their related lamps afford means for the transmission of signals by the lineman at some point remote from the office to the testman at the test desk X.

Interposed in the circuit between the jack-panel and the jacks $J_5$, $J_6$, $J_7$, $J_8$, are the jacks $J_9$ and $J_{10}$, which, together with the relay $R_1$, afford the means for connecting the Wheatstone bridge circuit 1 with the line circuits and to select the proper conductors therefrom for making the tests. The said bridge circuit has associated with it the plug $P_8$ adapted to connect the said circuit with the conductors connected with the contacts of jacks $J_9$ and $J_{10}$. This bridge circuit shows variable ratio arms, a variable resistance arm R, and a fourth arm adapted to be connected with the proper line conductors through the plug $P_8$. The sleeve contact of the plug $P_8$ has connected therewith a source of potential and a key $K_1$ for disconnecting the same, whereby the operation of the relay $R_1$ connected with the sleeves of the jacks $J_9$ and $J_{10}$ may be controlled.

Having in mind the foregoing description of the parts of the apparatus associated with this circuit, this invention will be clear from the following description of its mode of use. Let it be assumed that the line $L_2$ has become short circuited accidentally at some point "A," and it is desired to locate this point with respect to the exchange in order that the trouble might be cleared. Furthermore, let it be assumed that the line $L_1$ represents for example another pair of conductors preferably of the same gage of wire as the line $L_2$ and located in the same cable. Prior to beginning the test, a lineman would be sent to some point such as "B," which represents for example a cross-connecting point upon the said cable route, more distant from the office than the fault. After arriving there, he would signal to the operator at the office by means of any good circuit such as line $L_1$. The lines $L_1$ and $L_2$ would then be connected with the test desk X by the insertion of the plugs $P_1$, $P_2$, $P_3$ and $P_4$ in their respective jacks $J_1$, $J_2$, $J_3$ and $J_4$ at the jack-panel. The testman then would insert plug $P_5$ of his telephone set in jack $J_5$ and thereby would be enabled to talk with the lineman at the distant cable terminal. Upon giving the lineman instructions to connect together one good and one bad conductor, the testman would withdraw plug $P_5$ from jack $J_5$ and insert plug $P_6$ in jack $J_6$. This serves to open the circuit between the line and the switchboard and also to connect across the line conductors of the circuit one winding of the relay $R_2$. This, it will be seen, constitutes a ring-down circuit responsive to ringing current applied by the lineman to the line $L_1$ and adapted to produce a signal by the lighting of the lamp associated with the relay $R_2$ to attract the attention of the testman. Whenever such signal is received, the testman will again insert the plug $P_5$ in the jack $J_5$ and thereby will be enabled to talk to the lineman at some distant point.

Let it be assumed that the trouble upon the line $L_2$ has by previous test been determined to be a short circuit, and that the lineman on going to the point "B," has connected the tip conductor of that line with the tip conductor of line $L_1$. The testman at the test desk X would then proceed to locate the fault by making a measurement of the resistance of the loop comprising the tip conductor of the line $L_1$ and the tip conductor of the line $L_2$. It will be noticed that at the desk X, the tip conductor of the line $L_1$ is normally connected to the tip contact of the jack $J_9$ and the tip conductor of the line $L_2$ is normally connected with the tip contact of the jack $J_7$. By the operation of the relay $R_1$, however, the tip conductor of the line $L_2$ may be connected with the ring contact of the jack $J_9$ so that if the plug $P_8$ be inserted in the jack $J_9$, the tip conductors of the lines $L_1$ and $L_2$ will be connected with two arms of the Wheatstone bridge. It will furthermore be seen that since the battery is normally connected with the sleeve of plug $P_8$, the act of inserting this plug in the jack $J_9$ will cause the operation of the relay $R_1$, and will result in the connection of the tip conductors of both lines with the bridge circuit 1. By measuring the resistance of the loop comprising the two tip conductors the testman would be enabled to determine the loop resistance of the defective circuit.

In order to complete the test for the determination of the location of the fault, it would be necessary to make a Varley loop test. To do so, it is necessary to ground battery $B_1$ of the circuit 1, and also to ground the ring conductor of the line L, in some convenient manner. It will be noticed that when plug $P_8$ was inserted in the jack $J_9$, and relay $R_1$ operated in the manner just described, the ring conductor of the line $L_2$ is connected thereby with the tip conductor of the jack $J_7$. In order to apply current to the ring side of line $L_2$, the battery $B_1$ must, in effect, be connected with the tip contact of the jack $J_7$. This is accomplished by grounding the said battery by means of the key $K_2$, and at the same time grounding the tip contact of the jack $J_7$ by the operation of the key $K_3$. Accordingly, the tip conductors of the lines $L_1$ and $L_2$ will be connected with the two arms of the bridge circuit 1, and current will be supplied over the ring side of the line $L_2$ to the point where the defect is located.

It will be seen that by means of the jacks $J_9$ and $J_{10}$, relay $R_1$ and the reversing keys $K_1$ and $K_3$, any testing combination of the wires of two line circuits may be obtained for the circuit 1. Thus it has been seen that by the insertion of the plug $P_8$ in the jack $J_9$, and the operation of the relay $R_1$, both tip conductors of the lines are connected with the test circuit. By releasing the relay $R_1$, the tip conductor of line $L_1$ and the ring conductor of line $L_2$ are connected with the test circuit. If the plug $P_8$ is inserted in the jack $J_9$, and the relay $R_1$, is operated, the ring conductor of the line $L_1$ and the tip conductor of the line $L_2$ will be connected with the test circuit. By releasing the relay $R_1$, the ring conductors of both lines will be connected with the test circuit.

This arrangement disclosed herein not only affords means for attaining the same flexibility for testing the circuits associated therewith, that would be attained by the termination of the line circuits upon individual tip and ring jacks at the test desk itself, but also provides new and novel means for receiving signals transmitted by linemen at some remote point to the testman located at the test desk.

Although this invention has been shown in a certain form, it is not limited to this specific form and is capable of embodiment in other and different forms without departing from the spirit and scope of the appended claims.

What is claimed is:

1. In a testing system the combination of two pairs of wires having one wire of each pair connected together, a jack individual to each wire of said pairs, a cord circuit having plugs for the insertion in said jacks and having also two jacks associated therewith, means to connect the tip contacts of two of said plugs with the corresponding contacts of the said two jacks, means to connect the tip contacts of the other two plugs with the armatures of a relay the winding of which is connected with the sleeves of the said two jacks, means for connecting alternatively either of the conductors connected with the armatures of the said relay with the said two jacks, a Wheatstone bridge circuit adapted for connection with either of said two jacks, and means for controlling the operation of the said relay whereby the predetermined combination of wires of the said two pairs may be connected with the said Wheatstone bridge.

2. In a testing system the combination of an electrical circuit, the conductors of which may be short-circuited, a second circuit the conductors of which are similar to those of the said first mentioned circuit but free from circuit defects, a Wheatstone bridge network adapted for loop measurements, having a single multi-conductor cord and plug connected with the non-ratio arms of the said bridge network, adapted for connection with one conductor of the said first and one conductor of the said second circuit respectively, a plurality of jacks with any of which the said plug may coöperate, and a relay associated with one of said circuits and controllable by the insertion of the said plug in one of said jacks, whereby the predetermined combination of conductors may be connected with the arms of the bridge circuit.

3. In a testing system the combination of an electrical circuit, the conductors of which may be short-circuited, a second circuit the conductors of which are similar to those of the said first mentioned circuit but free from circuit defects, a Wheatstone bridge network adapted for loop measurements, having a single multi-conductor cord and plug connected with the non-ratio arms of the said bridge network, adapted for connection with one conductor of the said first and one conductor of the said second circuit respectively, a plurality of jacks with any of which the said plug may coöperate, a relay controlled by the connection of said plug with any of said jacks whereby one of the conductors of said second circuit may be connected with said bridge network and means to connect the other defective conductor of said first transmission circuit to ground, whereby a three-wire loop measurement may be made.

4. In a testing system the combination of a plurality of line circuits, a jack individual to each conductor of each circuit for terminating the same, a cord circuit having a plurality of plugs adapted to coöperate with the said jacks, a testing circuit adapted for connection with the said cord circuit and switching means associated with said cord circuit and controlled by the connection of the said testing circuit with the said cord circuit, for the selection of the line conductors desired for connection with the said testing circuit.

In testimony whereof, I have signed my name to this specification this 18th day of February 1920.

GEORGE W. KUHN.